US012684296B2

(12) United States Patent
Kim et al.

(10) Patent No.: US 12,684,296 B2
(45) Date of Patent: Jul. 14, 2026

(54) DISPLAY DEVICE

(71) Applicant: SAMSUNG DISPLAY CO., LTD., Yongin-si (KR)

(72) Inventors: Tae-Sung Kim, Yongin-si (KR); Koichi Abe, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 239 days.

(21) Appl. No.: 18/446,459

(22) Filed: Aug. 8, 2023

(65) Prior Publication Data

US 2024/0179471 A1 May 30, 2024

(30) Foreign Application Priority Data

Nov. 24, 2022 (KR) ........................ 10-2022-0158938

(51) Int. Cl.

| | |
|---|---|
| ***H04R 9/06*** | (2006.01) |
| ***H04R 7/04*** | (2006.01) |
| ***H04R 9/02*** | (2006.01) |
| ***H04R 9/04*** | (2006.01) |

(52) U.S. Cl.
CPC ............. *H04R 9/046* (2013.01); *H04R 7/045* (2013.01); *H04R 9/025* (2013.01); *H04R 9/06* (2013.01); *H04R 9/066* (2013.01); *H04R 2400/03* (2013.01); *H04R 2440/05* (2013.01); *H04R 2499/15* (2013.01)

(58) Field of Classification Search
CPC ........ H04R 1/025; H04R 7/045; H04R 9/025; H04R 9/046; H04R 9/06; H04R 9/066; H04R 2400/03; H04R 2440/05; H04R 2499/15
See application file for complete search history.

(56) References Cited

U.S. PATENT DOCUMENTS

| | | | | |
|---|---|---|---|---|
| 10,416,707 B2 | | 9/2019 | Choi et al. | |
| 10,567,880 B2 | | 2/2020 | Ham et al. | |
| 11,044,820 B2 | | 6/2021 | Yu et al. | |
| 2005/0133793 A1 | * | 6/2005 | Kim | H10D 30/6737 257/E29.147 |
| 2011/0205728 A1 | * | 8/2011 | Seo | G02F 1/133604 362/97.1 |
| 2019/0079556 A1 | | 3/2019 | Choi et al. | |
| 2020/0053441 A1 | * | 2/2020 | Kim | G06F 3/0412 |
| 2020/0128330 A1 | * | 4/2020 | Nam | H04R 9/025 |
| 2020/0336579 A1 | * | 10/2020 | Lee | H04M 1/035 |

FOREIGN PATENT DOCUMENTS

| | | |
|---|---|---|
| KR | 10-1704517 | 2/2017 |
| KR | 10-1746496 | 6/2017 |
| KR | 10-1780297 | 9/2017 |
| KR | 10-1780302 | 9/2017 |

(Continued)

*Primary Examiner* — Huyen D Le
(74) *Attorney, Agent, or Firm* — F. CHAU & ASSOCIATES, LLC

(57) ABSTRACT

A display device includes: a display panel that displays an image, a frame portion attached to a rear surface of the display panel, where the frame portion supports the display panel and includes at least one protrusion, and a vibration unit disposed between the frame portion and the display panel, where the vibration unit overlaps the protrusion and vibrates the display panel.

18 Claims, 10 Drawing Sheets

(56) References Cited

FOREIGN PATENT DOCUMENTS

| | | |
|---|---|---|
| KR | 1020170115124 | 10/2017 |
| KR | 1020170135465 | 12/2017 |
| KR | 10-1817102 | 1/2018 |
| KR | 10-1817103 | 1/2018 |
| KR | 10-1817105 | 1/2018 |
| KR | 1020190054553 | 5/2019 |
| KR | 1020200105393 | 9/2020 |
| KR | 10-2356326 | 1/2022 |
| KR | 10-2422071 | 7/2022 |

* cited by examiner

DISPLAY DEVICE

CROSS-REFERENCE TO RELATED APPLICATION

This application claims priority under 35 U.S.C. § 119 from Korean Patent Application No. 10-2022-0158938, filed on Nov. 24, 2022 in the Korean Intellectual Property Office (KIPO), the contents of which are herein incorporated by reference in their entirety.

TECHNICAL FIELD

Embodiments are directed to a display device. More particularly, embodiments are directed to a sound and image display device.

DISCUSSION OF THE RELATED ART

An audio and video display system displays an image on an image display device and transmits sound through an additional audio device such as a speaker. Accordingly, since a location where an image is displayed and a location where sound is transmitted differ from each other, a user's immersion in viewing a medium such as a movie is lowered.

Accordingly, research on a device that simultaneously transmits an image and sound is being continued. For example, a frame portion may attach a vibrating device that transmits sound to a display panel that displays an image and supports the vibrating device. At this time, since the frame portion is formed by assembling various members, many members may be required when forming the frame portion and the efficiency of the process of forming the frame portion may decrease.

SUMMARY

Embodiments provide a display device with increased manufacturing efficiency.

A display device according to embodiments of the present disclosure includes a display panel that displays am image, a frame portion attached to a rear surface of the display panel, where the frame portion supports the display panel and includes at least one protrusion, and a vibration unit disposed between the frame portion and the display panel, where the vibration unit overlaps the protrusion and vibrates the display panel.

In an embodiment, the frame portion is integrally formed as a whole.

In an embodiment, the frame portion covers the vibration unit and entirely overlaps the display panel.

In an embodiment, the frame portion includes iron.

In an embodiment, the display device further includes an adhesive layer interposed between the vibration unit and the display panel.

In an embodiment, the vibration unit contacts the rear surface of the display panel through the adhesive layer.

In an embodiment, the display panel includes a substrate and a display element layer disposed on the substrate.

In an embodiment, the frame portion is disposed under the substrate opposite to the display element layer and is attached to the substrate.

In an embodiment, the vibration unit includes a first plate disposed between the frame portion and the display panel and within the at least one protrusion, a magnetic circuit disposed between the first plate and the frame portion and within the at least one protrusion, and a coil that surrounds the first plate.

In an embodiment, the display device further includes a second plate connected to the frame portion, where the second plate overlaps the at least one protrusion of the frame portion and covers the at least one protrusion.

In an embodiment, the second plate includes a same material as the frame portion.

In an embodiment, the second plate includes iron.

A display device according to embodiments of the present disclosure includes a display panel that displays am image, a frame portion attached to a rear surface of the display panel, where the frame portion supports the display panel and includes at least one protrusion and a supporting portion coupled to the protrusion, and a vibration unit disposed between the frame portion and the display panel, where the vibration unit overlaps the protrusion and vibrates the display panel.

In an embodiment, the protrusion covers the vibration unit and a thickness of the at least one protrusion is greater than a thickness of the supporting portion.

In an embodiment, the at least one protrusion and the supporting portion are rotationally coupled.

In an embodiment, the display device further includes a plate disposed between the frame portion and the display panel and within the protrusion, a magnetic circuit disposed between the plate and the frame portion and within the at least one protrusion, and a coil that surrounds the plate.

In an embodiment, the display device further includes a mold that connects the at least one protrusion and the supporting portion.

In an embodiment, the supporting portion is spaced apart from the at least one protrusion and is coupled to the at least one protrusion through the mold.

In an embodiment, the mold includes an insulating material.

In an embodiment, the supporting portion is rotationally coupled to the mold.

A method of manufacturing a display device includes providing a display panel and a vibration unit that includes a coil, a bobbin, a cap, an adhesive layer, a magnetic circuit and a plate, where the coil, the bobbin, the cap, and the adhesive layer are offset in a first direction from a predetermined position of the display panel, where the first direction is perpendicular to a surface of the display panel, and a center of the coil and a center of a magnetic flux generated by the magnetic circuit are offset from each other, and forming a display device by attaching the display panel to the adhesive layer, where a rear surface of the display panel is disposed at the predetermined position, and the coil, the bobbin, the cap, and the adhesive layer descend in a second direction opposite to the first direction and the center of the coil descends in the second direction so that the center of the coil and the center of the magnetic flux coincide.

In an embodiment, the coil, the bobbin, the cap, and the adhesive layer are connected to each other.

In an embodiment, the method further includes providing a frame portion that includes a protrusion, wherein the coil and the bobbin are disposed between and spaced apart from the plate and the protrusion.

In an embodiment, a first position difference in the first direction between the adhesive layer before the display panel is attached and the adhesive layer after the display panel is attached and a second position difference in the first direction between the center of the coil and the center of the magnetic flux are equal to each other.

In a display device according to embodiments, since a frame portion is integrally formed, a structure of the frame portion is simplified. Accordingly, since the structure of the frame portion is simplified, materials for coupling can be omitted, and thus material costs can be reduced. In addition, the process of assembling the frame portion can be omitted. Accordingly, the manufacturing process of the display device can be simplified.

In addition, an entire frame portion has the same thickness. By further disposing a second plate that overlaps a protrusion, a relatively greater magnetic force can be formed on a side of the protrusion. Therefore, even if the protrusion is relatively thin, the thinness of the protrusion can be supplemented by additionally attaching the second plate.

The frame portion may include the protrusion portion and a supporting portion formed separately from each other, and a thickness of the protrusion is greater than a thickness of the supporting portion. Accordingly, the frame portion has a greater thickness at the protrusion. Since the protrusion is thicker than the supporting portion, a relatively greater magnetic force can be formed on the side of the protrusion. Accordingly, weakening of the magnetic force of the display device can be prevented by separately forming the protrusion and the supporting portion and coupling the protrusion and the supporting portion with each other.

DETAILED DESCRIPTION

Figure 1:
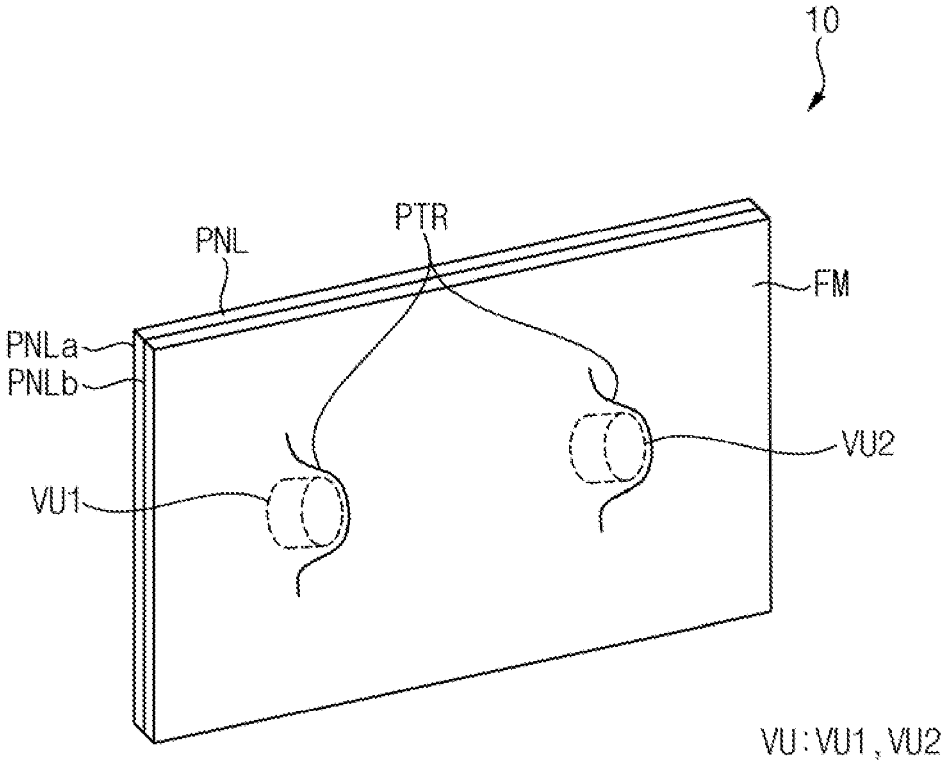
FIG. 1 is a perspective view of a display device according to an embodiment of the present disclosure.

Hereinafter, a display device according to embodiments of the present disclosure will be described in detail with reference to the accompanying drawings. The same reference numerals may be used for the same components in the drawings, and redundant descriptions of the same components may be omitted.

Figure 2:
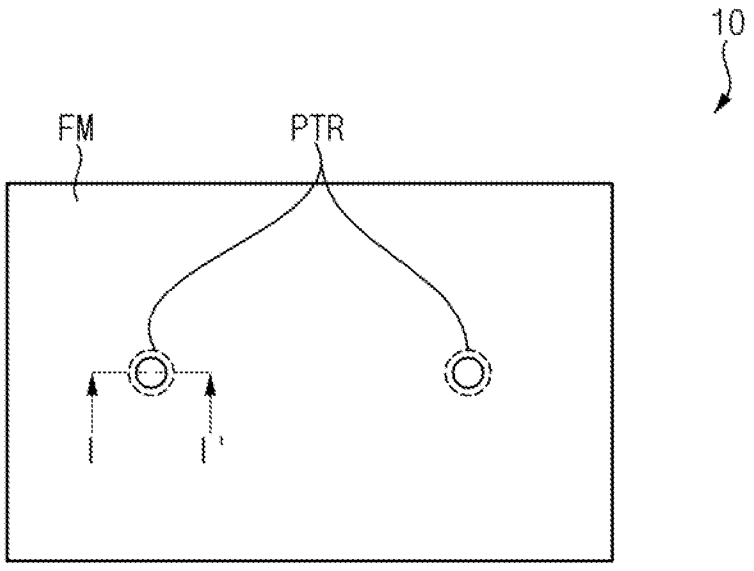
FIG. 2 is a rear view of a display device according to an embodiment of the present disclosure.

FIG. 1 is a perspective view of a display device according to an embodiment of the present disclosure. FIG. 2 is a rear view of a display device according to an embodiment of the present disclosure.

Referring to FIGS. 1 and 2, in an embodiment, a display device 10 includes a display panel PNL, a frame portion FM, and a vibration unit VU.

The display panel PNL displays an image. The display panel PNL includes a front surface PNLa on which an image is displayed and a rear surface PNLb opposite to the front surface PNLa and on which no image is displayed. The display panel PNL includes a substrate and a display element layer (see FIG. 3). The display element layer is disposed on the substrate. The rear surface PNLb of the display panel PNL is a rear surface of the substrate.

The frame portion FM is attached to the rear surface PNLb of the display panel PNL. The frame portion FM supports the display panel PNL on the rear surface PNLb of the display panel PNL. The frame portion FM includes at least one protrusion PTR.

The frame portion FM is integrally formed as a whole. Accordingly, the frame portion FM has a shape in which both the protrusion PTR and a portion other than the protrusion PTR integrally extend.

The vibration unit VU is disposed between the frame portion FM and the display panel PNL. The vibration unit VU generates vibration. Accordingly, the vibration unit VU transmits vibrations to the display panel PNL to vibrate the display panel PNL.

The vibration unit VU overlaps the protrusion PTR. The number of vibration units VU is at least one. For example, the number of vibration units VU is two. Accordingly, the number of protrusions PTR is two. One vibration unit VU overlaps one protrusion PTR. For example, the number of vibration units VU equals the number of protrusions PTR.

For example, when there are two vibration units VU, the vibration unit VU includes a first vibration unit VU1 and a second vibration unit VU2. The first vibration unit VU1 and the second vibration unit VU2 are spaced apart from each other.

For example, the display panel PNL includes a left area and a right area. The first vibration unit VU1 overlaps the left area of the display panel PNL, and the second vibration unit VU2 overlaps the right area of the display panel PNL. Accordingly, the first vibration unit VU1 vibrates the left area of the display panel PNL. In addition, the second vibration unit VU2 vibrates the right area of the display panel PNL.

Each of the first and second vibration units VU1 and VU2 is independently driven by receiving different vibration signals. For example, the first vibration unit VU1 generates sound by using the left area of the display panel PNL as a vibration plate. In addition, the second vibration unit VU2 generates sound by using the right area of the display panel PNL as a vibration plate.

Figure 3:
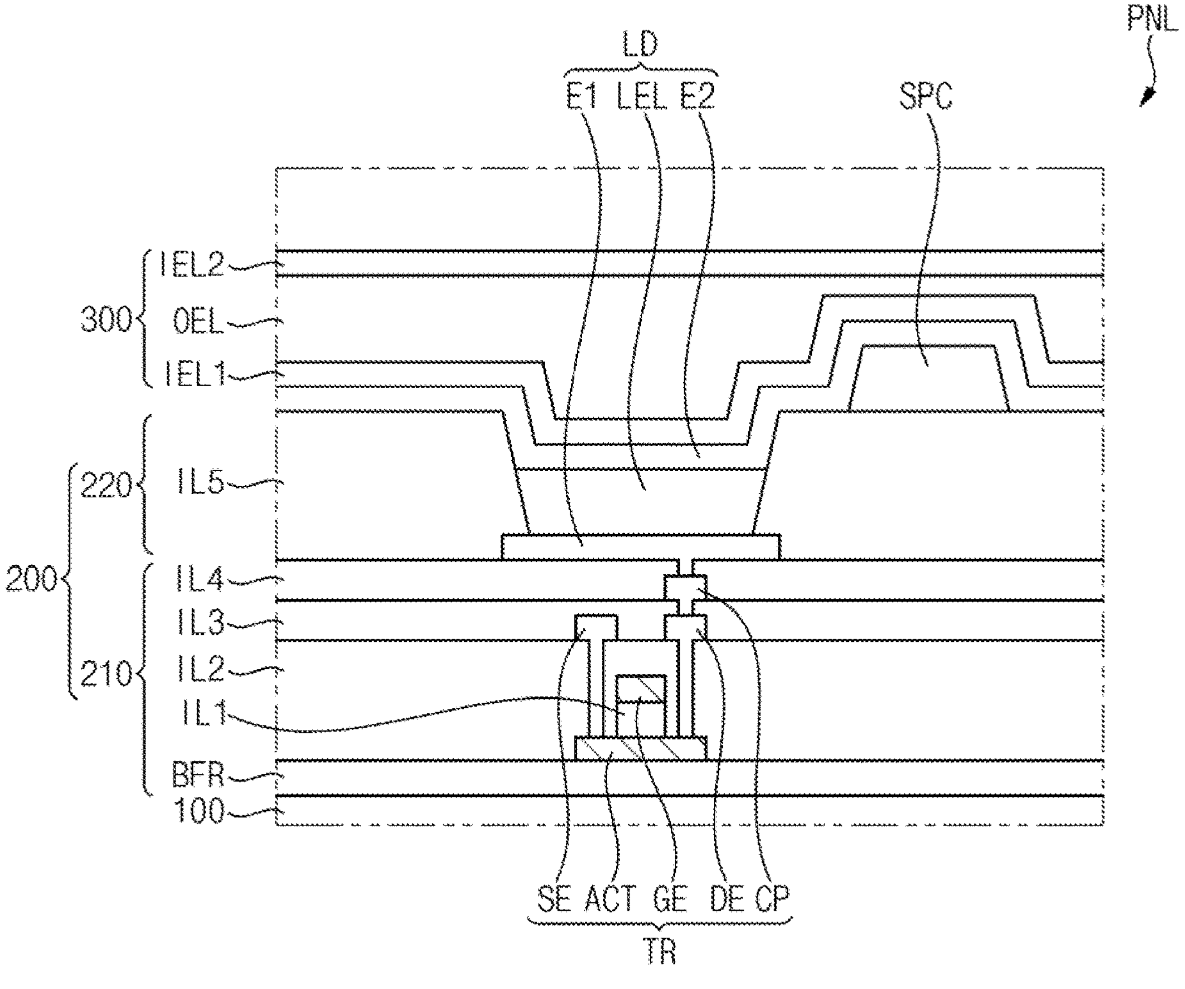
FIG. 3 is a cross-sectional view of a portion of a display panel of FIG. 1.

FIG. 3 is a cross-sectional view of a portion of a display panel of FIG. 1.

Referring to FIGS. 1 and 3, in an embodiment, the display panel PNL includes a substrate 100, a display element layer 200, and an encapsulation layer 300.

The substrate 100 includes a transparent or opaque material. For example, the substrate 100 is a rigid substrate made of quartz or glass, etc. For another example, the substrate 100 is a flexible substrate made of polyimide, etc. A flexible substrate has a structure in which polyimide layers and barrier layers are alternately stacked.

The display element layer 200 is disposed on the substrate 100 and emits light. Accordingly, the display element layer 200 displays an image on an entire surface of the display panel PNL.

The display element layer 200 includes a circuit element layer 210 and a light emitting element layer 220.

The circuit element layer 210 is disposed on the substrate 100, and includes a buffer layer BFR, at least one transistor TR, a connection electrode CP, a first insulating layer IL1, a second insulating layer IL2, a third insulating layer IL3, and a fourth insulating layer IL4. The transistor TR includes an active layer ACT, a gate electrode GE, a source electrode SE, and a drain electrode DE.

The light emitting element layer 220 is disposed on the circuit element layer 210 and includes a fifth insulating layer IL5, a spacer SPC, and a light emitting diode LD. The light emitting diode LD includes a first electrode E1, a light emitting layer LEL, and a second electrode E2.

The buffer layer BFR is disposed on the substrate 100. The buffer layer BFR prevents diffusion of metal atoms or impurities from the substrate 100 into the active layer ACT.

The active layer ACT is disposed on the buffer layer BFR. The active layer ACT is divided into a source region and a drain region doped with impurities and a channel region between the source region and the drain region.

The first insulating layer IL1 is disposed on the buffer layer BFR. The first insulating layer IL1 covers the active layer ACT. However, embodiments are not necessarily limited thereto. In an embodiment, the first insulating layer IL1 has substantially the same thickness along the profile of the active layer ACT. The first insulating layer IL1 includes an inorganic material.

The gate electrode GE is disposed on the first insulating layer IL1. In an embodiment, the gate electrode GE overlaps the channel region of the active layer ACT.

The second insulating layer IL2 is disposed on the buffer layer BFR. In addition, the second insulating layer IL2 covers the gate electrode GE. However, embodiments are not necessarily limited thereto. In an embodiment, second insulating layer IL2 is disposed on the first insulating layer IL, and has substantially the same thickness along the profile of the gate electrode GE.

The source electrode SE and the drain electrode DE are disposed on the second insulating layer IL2. The source electrode SE contacts the source region of the active layer ACT through a first contact hole formed in the second insulating layer IL2. The drain electrode DE contacts the drain region of the active layer ACT through a second contact hole formed in the second insulating layer IL2.

The third insulating layer IL3 is disposed on the second insulating layer IL2. In addition, the third insulating layer IL3 covers the source and drain electrodes SE and DE, and has a substantially flat upper surface without creating a step around the source and drain electrodes SE and DE. The third insulating layer IL3 includes an organic material.

The connection electrode CP is disposed on the third insulating layer IL3. The connection electrode CP contacts one of the source electrode SE or the drain electrode DE through a second contact hole formed in the third insulating layer IL3. However, in an embodiment, the connection electrode CP may be omitted. In addition, in an embodiment, there are a plurality of connection electrodes CP.

The fourth insulating layer IL4 is disposed on the third insulating layer IL3. In addition, the fourth insulating layer IL4 covers the connection electrode CP and has a substantially flat upper surface without creating a step around the connection electrode CP. The fourth insulating layer IL4 includes an organic material.

The first electrode E1 is disposed on the fourth insulating layer IL4. The first electrode E1 has reflective or light-transmitting properties. For example, the first electrode E1 includes a metal.

The first electrode E1 contacts the connection electrode CP through a third contact hole formed in the fourth insulating layer IL4. Through this, the first electrode E1 is connected to the transistor TR.

The fifth insulating layer IL5 is disposed on the fourth insulating layer IL4, and has an opening that exposes an upper surface of the first electrode E1. The fifth insulating layer IL5 covers an edge of the first electrode E1. The fifth insulating layer IL5 includes an organic material or an inorganic material.

The spacer SPC is disposed on the fifth insulating layer IL5. The spacer SPC includes an organic material or an inorganic material. The spacer SPC maintains a gap between the encapsulation layer 300 and the substrate 100.

The spacer SPC includes a material that differs from a material of the fifth insulating layer IL5. The spacer SPC is formed after the fifth insulating layer IL5 is formed. However, embodiments according to the present disclosure are not necessarily limited thereto, and in some embodiments, the spacer SPC includes the same material as the fifth insulating layer IL5. For example, each of the fifth insulating layer IL5 and the spacer SPC includes an organic material such as polyimide. In addition, in some embodiments, the fifth insulating layer IL5 and the spacer SPC are simultaneously formed using a halftone mask.

The light emitting layer LEL is disposed on the first electrode E1. The light emitting layer LEL is disposed in the opening formed in the fifth insulating layer IL5. In an embodiment, the light emitting layer LEL has a multilayer structure that includes a hole injection layer, a hole transport layer, an organic light emitting layer, an electron transport layer, and an electron injection layer. The organic light emitting layer includes a light emitting material.

The second electrode E2 covers the light emitting layer LEL and is disposed on the fifth insulating layer IL5 and the spacer SPC. In an embodiment, the second electrode E2 has a plate shape. In addition, the second electrode E2 has light-transmitting or reflective properties. For example, the second electrode E2 includes a metal. In an embodiment, the second electrode E2 covers an entire display area of the display panel PNL.

The encapsulation layer 300 prevents external moisture and oxygen from penetrating into the light emitting diode LD. The encapsulation layer 300 includes a first inorganic encapsulation layer IEL1, an organic encapsulation layer OEL, and a second inorganic encapsulation layer IEL2.

The first inorganic encapsulation layer IEL1 is disposed on the second electrode E2 with substantially the same thickness along the profile of the second electrode E2. The organic encapsulation layer OEL is disposed on the first inorganic encapsulation layer IEL1, and has a substantially flat upper surface without creating a step around the first inorganic encapsulation layer IEL1. The second inorganic encapsulation layer IEL2 is disposed on the organic encapsulation layer OEL. In an embodiment, an upper surface of the second inorganic encapsulation layer IEL2, opposite to the organic encapsulation layer OEL, corresponds to the front surface PNLa of the display panel PNL.

Figure 4:
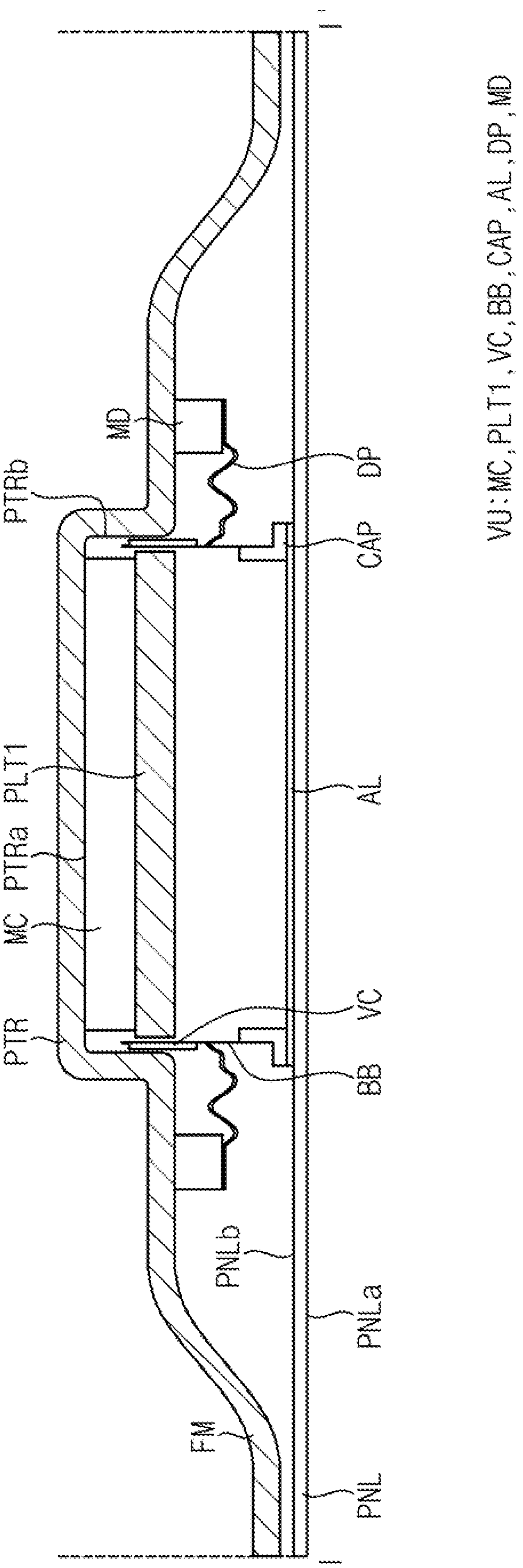
FIG. 4 is a cross-sectional view taken along line I-I' of FIG. 2.

FIG. 4 is a cross-sectional view taken along line I-I' of FIG. 2.

Referring to FIGS. 1, 2, and 4, in an embodiment, the frame portion FM entirely overlaps the display panel PNL. For example, for the frame portion FM to stably support the display panel PNL, an edge of the frame portion FM is disposed adjacent to an edge of the display panel PNL. However, embodiments of the present disclosure are not necessarily limited thereto.

The frame unit FM covers the vibration unit VU. One surface PTRa of the protrusion PTR of the frame portion FM contacts the vibration unit VU. However, the inner surface PTRb of the protrusion PTR is spaced apart from the vibration unit VU.

The frame portion FM includes iron. For example, the frame portion FM is made of iron and is integrally formed.

The frame portion FM is disposed under the substrate 100 of the display panel PNL. For example, the frame portion FM is attached to the rear surface of the substrate 100, such as the rear surface PNLb of the display panel PNL. The frame portion FM is attached to the substrate 100 through an adhesive member, etc. However, embodiments of the present disclosure are not necessarily limited thereto.

The vibration unit VU is disposed between the frame portion FM and the display panel PNL. The vibration unit VU overlaps the protrusion PTR. At least a portion of the vibration unit VU is disposed within the protrusion PTR.

The vibration unit VU directly contacts the display panel PNL. For example, the vibration unit VU directly vibrates the display panel PNL by contacting the rear surface PNLb of the display panel PNL. Accordingly, the vibration unit VU vibrates to vibrate the display panel PNL, and the display panel PNL receives the vibration of the vibration unit VU and outputs sound.

For example, the vibration unit VU is a speaker and is one of a sound exciter, a sound actuator, or a piezoelectric element. However, embodiments of the present disclosure are not necessarily limited thereto.

The vibration unit VU includes a first plate PLT1, a magnetic circuit MC, a coil VC, a bobbin BB, a cap CAP, an adhesive layer AL, a damper DP, and a mold MD.

The first plate PLT1 is disposed within the protrusion PTR and is spaced apart from the frame portion FM. In addition, the first plate PLT1 is disposed between the frame portion FM and the display panel PNL. The first plate PLT1 includes iron. For example, the first plate PLT1 includes the same material as the frame portion FM. The first plate PLT1 increases a magnetic flux density formed through the magnetic circuit MC.

The magnetic circuit MC is disposed within the protrusion PTR. The magnetic circuit MC is disposed in the protrusion PTR between the first plate PLT1 and the frame portion FM. In addition, one surface of the magnetic circuit MC contacts the protrusion PTR, and the other surface of the magnetic circuit MC contacts the first plate PLT1. However, a side surface of the magnetic circuit MC is spaced apart from the frame portion FM. The magnetic circuit MC generates a magnetic flux.

The bobbin BB surrounds the first plate PLT1. The bobbin BB overlaps the protrusion PTR, and at least a portion of the bobbin BB is disposed within the protrusion PTR. The bobbin BB is spaced apart from the first plate PLT1 and the frame portion FM.

The coil VC isa disposed within the protrusion PTR. The coil VC is wound on an outer surface of the bobbin BB. Accordingly, the coil VC is spaced apart from the first plate PLT1 and surrounds the first plate PLT1. When a current is applied to the coil VC, the bobbin BB vibrates based on a magnetic field formed around the coil VC and a magnetic field formed around the magnetic circuit MC.

The cap CAP is disposed between the bobbin BB and the display panel PNL. The cap CAP is connected to the bobbin BB and contacts the display panel PNL to connect the bobbin BB and the display panel PNL. The cap CAP transfers the vibration of the bobbin BB to the display panel PNL.

The adhesive layer AL is interposed between the vibration unit VU and the display panel PNL. The vibration unit VU contacts the rear surface PNLb of the display panel PNL through the adhesive layer AL. For example, the adhesive layer AL attaches the cap CAP to the display panel PNL. In an embodiment, the adhesive layer AL is implemented as a double-sided tape. However, embodiments of the present disclosure are not necessarily limited thereto.

The damper DP is connected to the frame portion FM and is connected to the bobbin BB. The damper DP guides vibration of the bobbin BB. The damper DP has a curved structure, such as a partially folded structure, and contracts and relaxes according to a linear reciprocating motion of the bobbin BB. Accordingly, the damper DP controls or guides the vibration of the bobbin BB.

The mold MD connects the damper DP and the frame portion FM. For example, the damper DP is connected to the frame portion FM through the mold MD so that one end of the damper DP is fixed.

In an embodiment, since the frame portion FM is integrally formed, the structure of the frame portion FM is simplified. Accordingly, since the structure of the frame portion FM is simplified, materials for coupling can be omitted, and thus material cost can be reduced. In addition, an assembling process of the frame portion FM can be omitted. Thus, the manufacturing process of the display device 10 is simplified.

Figure 5:
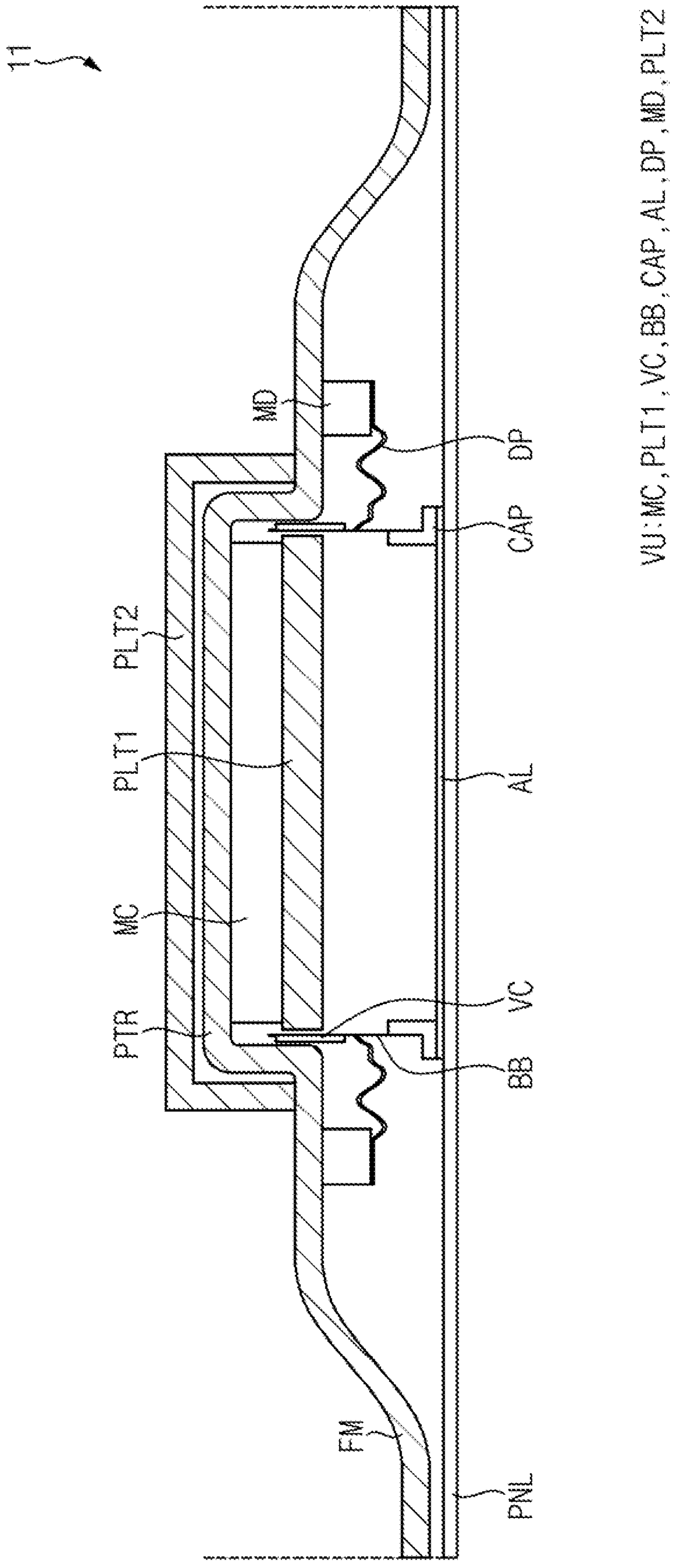
FIG. 5 is a cross-sectional view of another example of FIG. 4.

FIG. 5 is a cross-sectional view of another example of FIG. 4.

A display device 11 described with reference to FIG. 5 is substantially the same as the display device 10 described with reference to FIG. 4 except for the second plate PLT2. Therefore, redundant descriptions may be omitted or simplified.

Referring to FIG. 5, in an embodiment, the display device 11 further includes a second plate PLT2. The second plate PLT2 overlaps the protrusion PTR of the frame portion FM. The second plate PLT2 covers the protrusion PTR. The second plate PLT2 is connected to the frame portion FM.

The second plate PLT2 includes the same material as the frame portion FM. For example, the second plate PLT2 includes iron.

In an embodiment, the frame portion FM has the same thickness as a whole. However, by further disposing the second plate PLT2 that overlaps the protrusion PTR, a relatively greater magnetic force can be formed toward the protrusion PTR. Therefore, even if the protrusion PTR has a relatively small thickness, the small thickness of the protrusion PTR is supplemented by additionally attaching the second plate PLT2.

Figure 6:
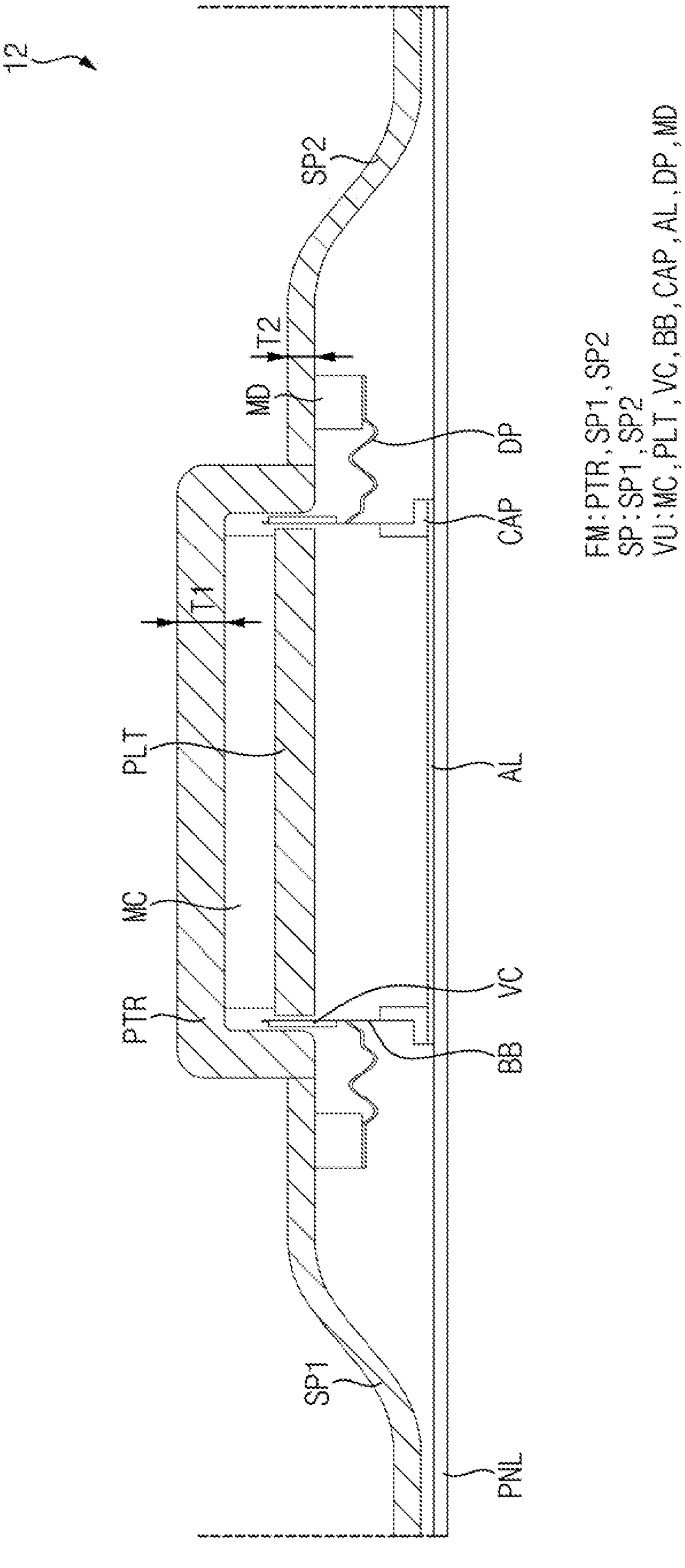
FIG. 6 is a cross-sectional view of a portion of a display device according to an embodiment.

FIG. 6 is a cross-sectional view of a portion of a display device according to an embodiment.

A display device 12 described with reference to FIG. 6 is substantially the same as the display device 10 described with reference to FIG. 4 except for the frame portion FM. Therefore, redundant descriptions may be omitted or simplified.

Referring to FIG. 6, in an embodiment, the display device 12 includes a display panel PNL, a frame portion FM, and a vibration unit VU.

The display panel PNL displays an image. The frame portion FM is attached to a rear surface PNLb of the display panel PNL to support the display panel PNL. The vibration unit VU is disposed between the frame portion FM and the display panel PNL. The vibration unit VU vibrates the display panel PNL.

The vibration unit VU overlaps the protrusion PTR. The vibration unit VU includes a plate PLT, a magnetic circuit MC, a coil VC, a bobbin BB, a cap CAP, an adhesive layer AL, a damper DP, and a mold MD.

In an embodiment, the frame portion FM includes at least one protrusion PTR and a supporting portion SP. The protrusion PTR covers the vibration unit VU. The protrusion PTR protrudes further from the rear surface PNLb of the display panel PNL than the supporting portion SP. The supporting portion SP and the protrusion PTR include the same material. For example, the supporting portion SP and the protrusion PTR include iron.

The plate PLT is disposed within the protrusion PTR. The plate PLT is disposed between the protrusion PTR and the display panel PNL. The magnetic circuit MC is disposed within the protrusion PTR. The magnetic circuit MC is disposed between the plate PLT and the protrusion PTR. The coil VC surrounds the plate PLT.

An inner surface PTRb (see FIG. 4) of the protrusion PTR and a side surface of each of the magnetic circuit MC and the plate PLT are spaced apart from each other. The coil VC is spaced apart from the protrusion PTR and disposed between the plate PLT and the protrusion PTR.

In an embodiment, the supporting portion SP is formed separately from the protrusion PTR, and includes a first supporting portion SP1 and a second supporting portion SP2. However, embodiments of the present disclosure are not necessarily limited thereto, and in an embodiment, the first supporting portion SP1 and the second supporting portion SP2 are integrally formed. Each of the first supporting portion SP1 and the second supporting portion SP2 is coupled to the protrusion PTR. Each of the first supporting portion SP1 and the second supporting portion SP2 is rotationally coupled to the protrusion PTR.

For example, in an embodiment, the protrusion PTR includes a first screw thread, the first support portion SP1 includes a second screw thread, and the second support portion SP2 includes a third screw thread. Accordingly, as the second screw thread and the third screw thread are rotationally coupled to the first screw thread, the first supporting portion SP1 and the second supporting portion SP2 are coupled to the protrusion PTR. However, embodiments of the present disclosure are not necessarily limited thereto, and in other embodiments, the first supporting portion SP1 and the second supporting portion SP2 are coupled to the protrusion PTR in various other ways.

In an embodiment, a thickness T1 of the protrusion PTR is greater than a thickness T2 of the supporting portion SP. Accordingly, the frame portion FM has a greater thickness in the protrusion PTR. Since the protrusion PTR is thicker than the supporting portion SP, a relatively greater magnetic force can be formed toward the protrusion PTR. Accordingly, weakening of the magnetic force of the display device 11 can be prevented by separately forming the protrusion PTR and the supporting portion SP and coupling them with each other.

Figure 7:
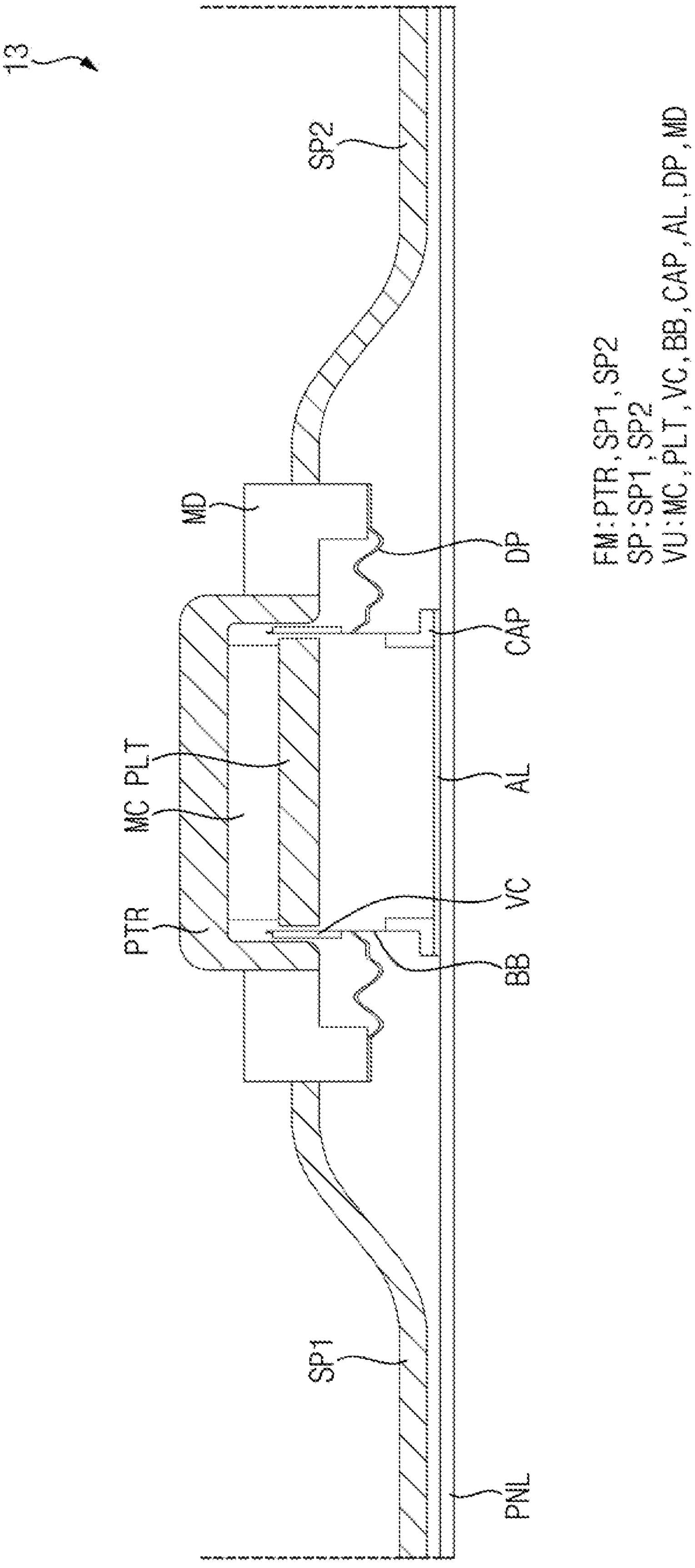
FIG. 7 is a cross-sectional view of another example of FIG. 6.

FIG. 7 is a cross-sectional view of another example of FIG. 6.

The display device 13 described with reference to FIG. 7 is substantially the same as the display device 12 described with reference to FIG. 6 except for the mold MD and the frame unit FM. Therefore, redundant descriptions may be omitted or simplified.

Referring to FIG. 7, in an embodiment, the display device 13 includes the mold MD. The mold MD connects the damper DP and the protrusion PTR. In addition, the mold MD connects between the protrusion PTR and the supporting portion SP.

In an embodiment, the supporting portion SP is spaced apart from the protrusion PTR. The supporting portion SP is coupled to the protrusion PTR through the mold MD. The mold MD is connected to the protrusion PTR and is rotationally coupled with the supporting portion SP. For example, each of the mold MD and the supporting portion SP includes a screw thread, and the screw threads are rotationally coupled to each other. Accordingly, the supporting portion SP is connected to the protrusion PTR.

The mold MD includes an insulating material. Since the mold MD includes an insulating material, magnetic flux (or magnetic force) generated in the magnetic circuit MC does not leak toward the supporting portion SP. For example, when the mold MD is not disposed between the supporting portion SP and the protrusion PTR, the magnetic flux (or magnetic force) generated in the magnetic circuit MC can flow toward the protrusion PTR.

However, since the mold MD is disposed between the protrusion PTR and the supporting portion SP, the magnetic flux (or magnetic force) is not transferred from the protrusion PTR toward the supporting portion SP. Thus, the efficiency of the display device 13 is increased.

Figure 8:
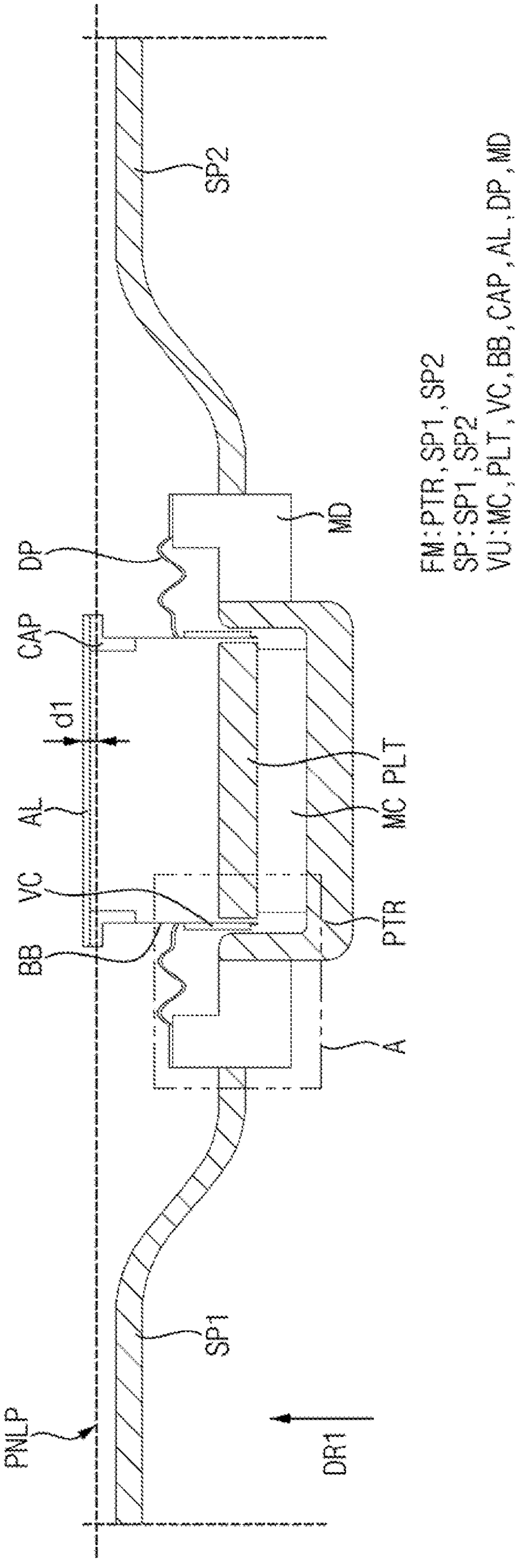
FIGS. 8, 9, 10, and 11 are cross-sectional views that illustrate manufacturing processes of a display device according to an embodiment of the present disclosure.
Figure 9:
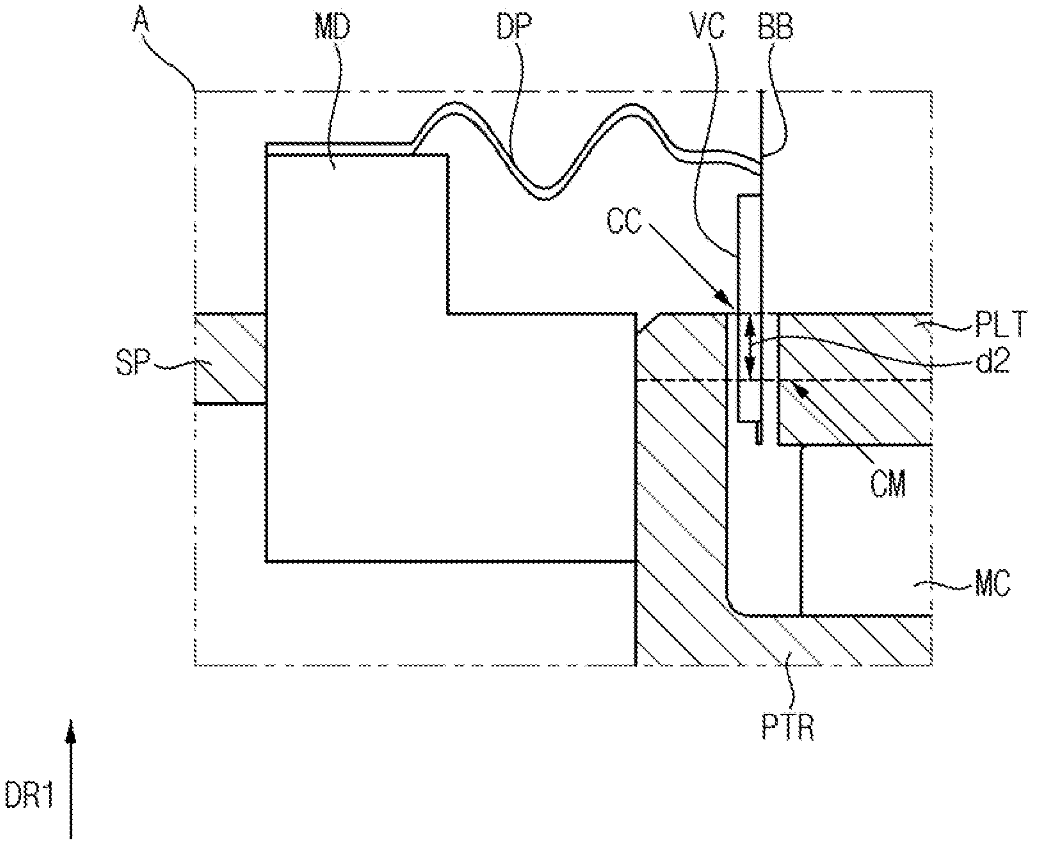
Figure 10:
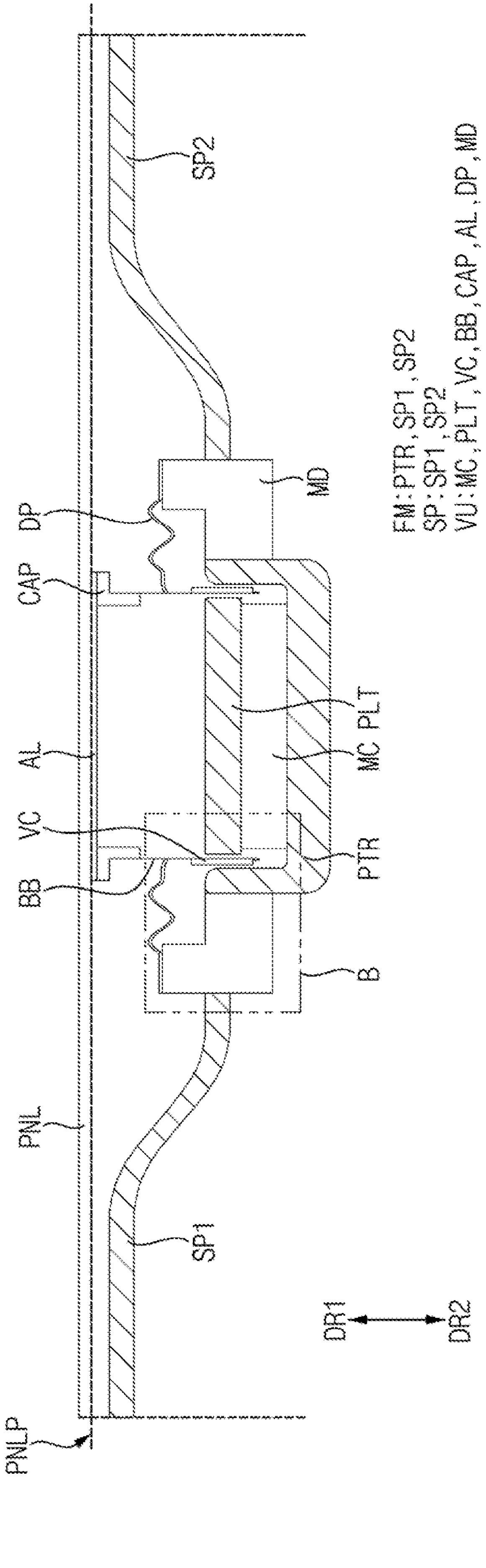
Figure 11:
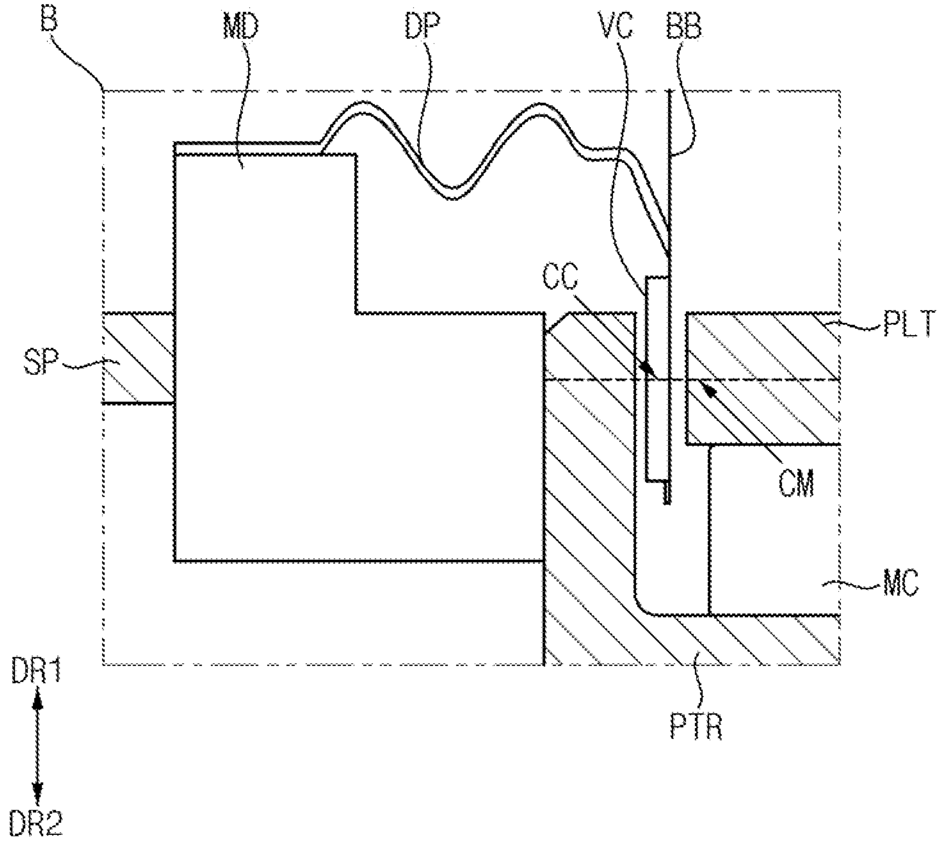

FIGS. 8, 9, 10, and 11 are cross-sectional views that illustrate manufacturing processes of a display device according to an embodiment of the present disclosure. FIG. 9 is an enlarged cross-sectional view of area A of FIG. 8. FIG. 11 is an enlarged cross-sectional view of area B of FIG. 10.

For example, FIGS. 8, 9, 10, and 11 illustrate a manufacturing process of the display device 13 of FIG. 7. However, embodiments of the present disclosure are not necessarily limited thereto, and a process can be applied to all of the display devices 10, 11, 12, and 13.

FIGS. 8 and 9 show the display panel PNL before being attached to the adhesive layer AL, and FIGS. 10 and 11 show the display panel PNL after being attached to the adhesive layer AL.

Referring to FIG. 8, in an embodiment, a display panel PNL, a vibration unit VU and a frame portion FM are provided. The frame portion FM includes a protrusion PTR. The vibration unit VU includes a coil VC, a bobbin BB, a cap CAP, an adhesive layer AL, a magnetic circuit MC and a plate PLT. The coil VC, the bobbin BB, the cap CAP, and the adhesive layer AL can move integrally with each other. For example, the coil VC, the bobbin BB, the cap CAP, and the adhesive layer AL are connected to each other.

The coil VC and the bobbin BB are disposed between the plate PLT and the protrusion PTR. The coil VC and the bobbin BB are spaced apart from the plate PLT and the protrusion PTR. Accordingly, the coil VC, the bobbin BB, the cap CAP, and the adhesive layer AL can individually move with the frame portion FM, the magnetic circuit MC, and the plate PLT.

In an embodiment, the coil VC, the bobbin BB, the cap CAP, and the adhesive layer AL are offset in a first direction DR1 from a predetermined position PNLP of the display panel PNL. The first direction DR1 is opposite to a direction in which the protrusion PTR protrudes. For example, the coil VC, the bobbin BB, the cap CAP, and the adhesive layer AL are spaced apart in the first direction DR1 from the predetermined position PNLP of the display panel PNL.

Further referring to FIG. 9, in an embodiment, when the coil VC, the bobbin BB, the cap CAP, and the adhesive layer AL are offset in the first direction DR1, a center CC of the coil VC and a center CM of the magnetic flux generated by the magnetic circuit MC are offset from each other. The center CM of the magnetic flux is the same as a center of the plate PLT in the first direction DR1. For example, the center CC of the coil VC is spaced apart from the center CM of the magnetic flux in the first direction DR1. Therefore, the center CC of the coil VC does not coincide with the center of magnetic flux CM before the display panel PNL is brought into contact with the adhesive layer AL.

Referring to FIG. 10, in an embodiment, the display panel PNL is adhered to the adhesive layer AL. For example, a display device is formed by assembling the display panel PNL to the vibration unit VU. The rear surface PNLb of the display panel PNL is disposed at the predetermined position PNLP.

When the display panel PNL is adhered to the adhesive layer AL, the adhesive layer AL is pressed due to the weight of the display panel PNL. Accordingly, the display panel PNL may contact the adhesive layer AL, and the coil VC, the bobbin BB, the cap CAP, and the adhesive layer AL may descend in a second direction DR2. The second direction DR2 is opposite to the first direction DR1.

When the display panel PNL is bonded to the adhesive layer AL, the center CC of the coil VC descends in the second direction DR2. The center CC of the coil VC and the center CM of the magnetic flux coincide. Accordingly, this results in a stronger magnetic flux.

In an embodiment, a position of the adhesive layer AL before the display panel PNL is attached is set to be higher in the first direction DR1 than a position of the adhesive layer AL after the display panel PNL is attached. In addition, the display device is manufactured such that a position difference d1 (see FIG. 8) in the first direction DR1 between the adhesive layer AL before the display panel PNL is attached and the adhesive layer AL after the display panel PNL is attached and a position difference d2 (see FIG. 9) in the first direction DR1 between the center CC of the coil VC and the center CM of the magnetic flux are equal to each other. Specifically, the coil VC is manufactured such that the position differences d1 and d2 are equal to each other.

In an embodiment, since the coil VC, the bobbin BB, the cap CAP, and the adhesive layer AL are offset in the first direction DR1, the display panel PNL and the adhesive layer AL are in contact with and attached to each other without additional pressure when manufacturing the display device. For example, the display panel PNL is easily attached to the adhesive layer AL without additional pressure due to the weight of the display panel PNL. Thus, the manufacturing process of the display device is simplified.

Embodiments of the present disclosure can be incorporated into various display devices. For example, embodiments of the present disclosure can be incorporated into various display devices such as display devices for vehicles, ships and aircraft, portable communication devices, display devices for exhibition or information transmission, medical display devices, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of embodiments of the present inventive concept as defined in the claims. Therefore, it is to be understood that the foregoing is illustrative of various embodiments and is not to be construed as limited to specific embodiments disclosed, and that modifications to disclosed embodiments, as well as other embodiments, are intended to be included within the scope of the appended claims.

What is claimed is:

1. A display device, comprising:

a display panel that displays an image;

a frame portion attached to a rear surface of the display panel, wherein the frame portion supports the display panel and includes at least one protrusion; and a vibration unit disposed between the frame portion and the display panel, wherein the vibration unit overlaps the protrusion and vibrates the display panel, wherein the vibration unit includes:

a first plate disposed between the frame portion and the display panel and within the at least one protrusion, and a second plate connected to the frame portion, wherein the second plate overlaps the at least one protrusion of the frame portion and covers the at least one protrusion.

2. The display device of claim 1, wherein the frame portion is integrally formed as a whole.

3. The display device of claim 1, wherein the frame portion covers the vibration unit and entirely overlaps the display panel.

4. The display device of claim 1, wherein the frame portion includes iron.

5. The display device of claim 1, further comprising:

an adhesive layer interposed between the vibration unit and the display panel.

6. The display device of claim 5, wherein the vibration unit contacts the rear surface of the display panel through the adhesive layer.

7. The display device of claim 1, wherein the display panel includes:

a substrate; and a display element layer disposed on the substrate.

8. The display device of claim 7, wherein the frame portion is disposed under the substrate opposite to the display element layer and is attached to the substrate.

9. The display device of claim 1, wherein the vibration unit includes:

a magnetic circuit disposed between the first plate and the frame portion and within the at least one protrusion; and a coil that surrounds the first plate.

10. The display device of claim 9, wherein the second plate includes a same material as the frame portion.

11. The display device of claim 10, wherein the second plate includes iron.

12. A display device, comprising:

a display panel that displays an image;

a frame portion attached to a rear surface of the display panel, wherein the frame portion supports the display panel and includes at least one protrusion and a supporting portion coupled to the at least one protrusion; and a vibration unit disposed between the frame portion and the display panel, wherein the vibration unit overlaps the protrusion and vibrates the display panel, wherein the at least one protrusion covers the vibration unit and a thickness of the at least one protrusion along an entire length of the at least one protrusion is greater than a thickness of the supporting portion.

13. The display device of claim 12, wherein the at least one protrusion and the supporting portion are rotationally coupled.

14. The display device of claim 12, further comprising:

a plate disposed between the frame portion and the display panel and within the at least one protrusion;

a magnetic circuit disposed between the plate and the frame portion and within the at least one protrusion; and a coil that surrounds the plate.

15. The display device of claim 12, further comprising:

a mold that connects the at least one protrusion and the supporting portion.

16. The display device of claim 15, wherein the supporting portion is spaced apart from the at least one protrusion and is coupled to the at least one protrusion through the mold.

17. The display device of claim 15, wherein the mold includes an insulating material.

18. The display device of claim 15, wherein the supporting portion is rotationally coupled to the mold.

* * * * *